US011858260B2

(12) United States Patent

Carrasco Zanini Gonzalez et al.

(10) Patent No.: US 11,858,260 B2
(45) Date of Patent: Jan. 2, 2024

(54) MEDIA MANAGEMENT USING A MEDIA MANAGEMENT DEVICE

(71) Applicant: HEWLETT-PACKARD DEVELOPMENT COMPANY, L.P., Spring, TX (US)

(72) Inventors: Pablo Eduardo Carrasco Zanini Gonzalez, Sant Cugat del Valles (ES); Francisco Guerrero Carvajal, Sant Cugat del Valles (ES); Marcos Arminana Terrasa, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 25 days.

(21) Appl. No.: 16/977,962

(22) PCT Filed: Apr. 26, 2018

(86) PCT No.: PCT/US2018/029621
§ 371 (c)(1),
(2) Date: Sep. 3, 2020

(87) PCT Pub. No.: WO2019/209305
PCT Pub. Date: Oct. 31, 2019

(65) Prior Publication Data

US 2021/0008910 A1 Jan. 14, 2021

(51) Int. Cl.

| | |
|---|---|
| ***B41J 15/16*** | (2006.01) |
| ***B65H 20/02*** | (2006.01) |
| ***B65H 23/188*** | (2006.01) |

(52) U.S. Cl.
CPC .............. *B41J 15/16* (2013.01); *B65H 20/02* (2013.01); *B65H 23/1888* (2013.01); *B65H 2301/22* (2013.01); *B65H 2301/44318* (2013.01); *B65H 2801/21* (2013.01)

(58) Field of Classification Search
None
See application file for complete search history.

(56) References Cited

U.S. PATENT DOCUMENTS

| | | | | |
|---|---|---|---|---|
| 5,505,550 | A | 4/1996 | Kitahara | |
| 5,785,440 | A | 7/1998 | Nishikawa | |
| 6,168,333 | B1 * | 1/2001 | Merz | B41J 11/42 400/579 |
| 6,731,891 | B1 | 5/2004 | Calamita | |
| 6,977,669 | B2 | 12/2005 | Shih | |
| 7,860,417 | B2 | 12/2010 | Jones | |

(Continued)

FOREIGN PATENT DOCUMENTS

WO WO-2001042030 A2 6/2001

*Primary Examiner* — William A. Rivera

(57) ABSTRACT

Examples of a media management device for use in a media processing device are described, together with a media processing device for use with a media management device. The media management device supplies a continuous print media to the media processing device, while receiving the media from an external media source. The media management device is arranged to isolate a tension in the continuous print media experienced at the media processing device from a tension in the continuous print media experienced in the external media source.

17 Claims, 4 Drawing Sheets

(56) References Cited

U.S. PATENT DOCUMENTS

| | | | | |
|---|---|---|---|---|
| 8,465,146 | B2 * | 6/2013 | Satoh | B65H 23/16 242/564 |
| 9,044,977 | B2 | 6/2015 | Mclaughlin | |
| 9,427,990 | B2 | 8/2016 | Claramunt | |
| 9,463,943 | B2 | 10/2016 | Kawakami | |
| 9,545,803 | B2 | 1/2017 | Horaguchi | |
| 2007/0059078 | A1 | 3/2007 | Silverbrook | |
| 2013/0135379 | A1 * | 5/2013 | Hori | B41J 15/165 347/102 |
| 2014/0035984 | A1 * | 2/2014 | Mills, III | B41J 29/38 347/16 |
| 2014/0053745 | A1 * | 2/2014 | Dawley | B65H 23/1888 101/228 |
| 2015/0124016 | A1 | 5/2015 | Bildstein | |
| 2016/0272452 | A1 * | 9/2016 | Tokai | B65H 20/02 |
| 2017/0173980 | A1 | 6/2017 | Gonzalez Perello | |
| 2017/0275115 | A1 * | 9/2017 | Dettke | B65H 18/16 |
| 2017/0282602 | A1 * | 10/2017 | Aoki | B41J 15/16 |
| 2017/0282605 | A1 * | 10/2017 | Yoshida | B65H 20/005 |
| 2017/0355204 | A1 * | 12/2017 | Imamura | B41J 15/16 |
| 2018/0272758 | A1 * | 9/2018 | Hori | B41J 11/0095 |
| 2018/0282103 | A1 * | 10/2018 | Sato | B65H 43/00 |
| 2019/0061387 | A1 * | 2/2019 | Tomino | B65H 23/046 |
| 2019/0062095 | A1 * | 2/2019 | Kudo | B65H 7/02 |

* cited by examiner

MEDIA MANAGEMENT USING A MEDIA MANAGEMENT DEVICE

BACKGROUND

It is often desired to print large format images on a wide variety of print media. These print media include paper, textiles such as canvas, and polymers such as vinyl and films. Large format printed output may take the form of, for example: posters, vehicle decal, rugs and wall-hangings, banners, signage, prints for framing, billboards, stickers and external artworks. For large format print outputs, the print media may be supplied as a roll, wherein a web of continuous print media extends through a printzone of a printing device. For small-to-medium sized organizations, a printing device for large format printing may be located within the premises of the organization, such as in a small office, warehouse or garage. A number of media processing devices may be supplied to handle media during a printing operation. Specialized water-based inks may be used that result in a durable, flexible film covering to protect the printed image. These inks may avoid the use of solvents and thus allow safe printing in a large variety of locations. Flexibility and variety are desired in large format printing devices, as new applications, inks and/or media types are developed.

BRIEF DESCRIPTION OF THE DRAWINGS

Various features of the present disclosure will be apparent from the detailed description which follows, taken in conjunction with the accompanying drawings, which together illustrate, features of certain examples, and wherein.

DETAILED DESCRIPTION

Certain examples described herein allow for increased flexibility in media processing devices such as printing and web handling devices. In particular, certain examples allow a greater variety of media types and supply formats by decoupling media management from a media processing operation. This is achieved through the use of a media management device that may be provided as an interface between an external source of continuous print media and a media processing zone of a media processing device. Example media management devices, and associated media processing devices, as described herein, allow media control in the media processing device to be isolated from conditions at the external media source. For example, this may allow a printing operation to be isolated from a roll supply. This then provides greater freedom of choice for media source configurations, e.g. large or "jumbo" rolls may be supported by certain printing devices. Example media management devices may be incorporated into new media processing devices and/or supplied as an upgrade kit to expand the capabilities of existing media processing devices. Also media processing devices couplable to example media management devices are described. The examples described herein may be used for large format printing with solvent-free inks, including inks that dry to have a protective polymer film on an upper surface.

Certain examples described herein may be used to improve existing printing devices that incorporate a roll of media within the printing device. These examples may allow for the printing device to use an external roll of media in place of a previous internal roll of media. Certain examples may improve media transport and simplify media control within a media processing device in an efficient manner without complex additions or modifications to the media processing device. Certain examples may also allow new media types, such as heavy vinyl sheets for use in flooring, laminates for decal and synthetic leather.

Figure 1A:
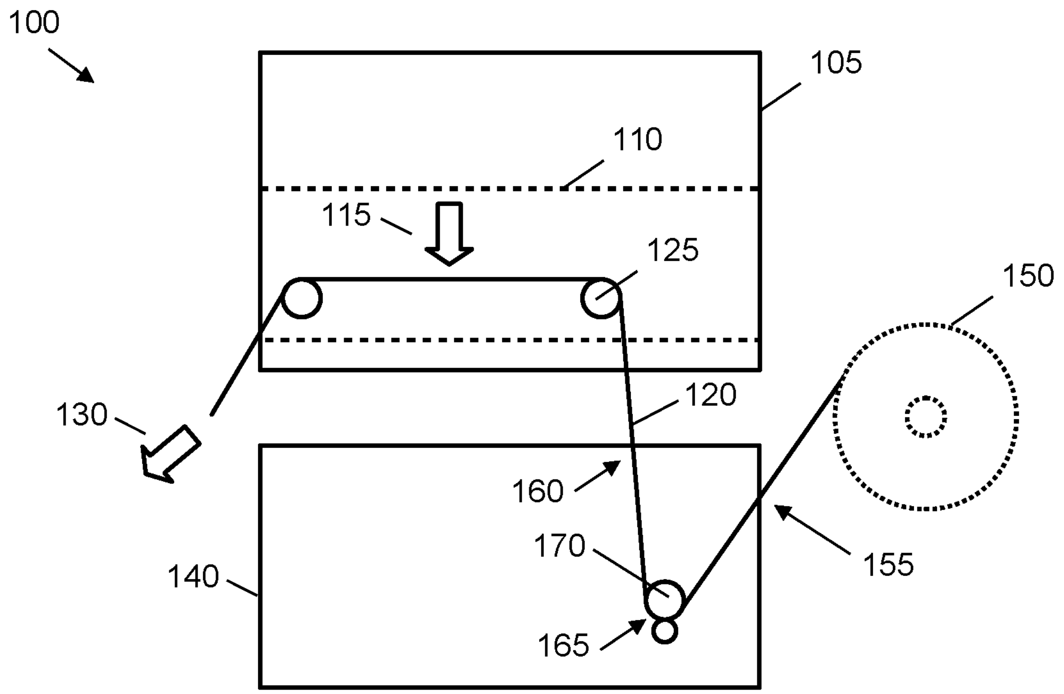
FIG. 1A is a schematic side view of a media processing device according to an example.

FIG. 1A shows an example 100 of a media processing device 105. In this example, the media processing device 105 comprises a printing device. However, the features described herein may also be incorporated into other media processing devices, such as folding devices, cutting devices, devices to apply glosses and varnishes, devices to apply undercoats and perform media preprocessing, and the like. For example, the features described herein may be used in any web handling device, e.g. any device that forms part of a printing system that prints on long stretches of substrate. In FIG. 1A, the printing device 105 is shown schematically from the side. Certain features are omitted for clarity and ease of explanation. The printing device 105 comprises a printzone 110 for deposit of printing fluid, e.g. as shown schematically using arrow 115, onto continuous print media 120. In other examples, this area may take the form of any media processing zone for processing a portion of media, e.g. the area where other printing fluids are applied or where media handling is performed. Continuous print media comprises a substrate for printing where consecutive sheets for printing are coupled, e.g. via a web of media. The continuous print media may be supplied in many different configurations, including single-roll configurations, multi-roll configurations (i.e. where two or more separate substrate webs are used) and free-fall configurations (e.g. where a leading or trailing edge is not rolled up). The continuous print media may comprise porous media (such as textiles or non-standard formats such as window blinds). In FIG. 1A, the continuous print media is supplied from an external media source. This may be, for example, a roll or a stack of folded media. It may also comprise an output of a previous media processing device, e.g. where the printing device 105 forms part of a chain of processing devices. A roll may comprise a spindle around which is wound layers of print media. The continuous print media may be a continuous sheet having a width and a length, where the length is much greater than the width (e.g. by one or two orders of magnitude).

Returning to FIG. 1A, the printzone 110 may comprise a section of a media transport system where one or more printheads of the printing device 105 are arranged to deposit printing fluid. The one or more printheads may be mounted within a moveable carriage that is translated above the continuous print media 120. In FIG. 1A, a scan axis of such a moveable carriage may be into the figure. The one or more printheads may be removable and replaceable, e.g. may be loaded into the moveable carriage to allow printing and removed when a printing fluid supply is exhausted. In other cases, one or more printheads may form part of a page-wide array, e.g. that extends over the continuous print media 120 along an axis that is perpendicular to the plane of the figure.

The printing device 105 and printzone 110 may take a number of different forms depending on the implementation.

In the example of FIG. 1A, the printing device 105 further comprises a motorized drive roller 125 to receive the continuous print media 120 for transport through the printzone 110. In other examples, this may comprise a motorized drive roller to transport the continuous print media through a media processing zone of a media processing device. The motorized driver roller 125 may extend along an axis that is perpendicular to the plane of the figure. The motorized driver roller 125 may comprise a material with a predefined coefficient of friction relative to a set of media types. In certain cases, the motorized driver roller 125 may comprise a rubber roller wherein the continuous print media 120 passes over the top of the roller. The motorized drive roller 125 may be directly or indirectly driven by a motor. In the latter case, the motorized drive roller 125 may be coupled to a gear and/or belt system to provide a torque. This torque may be controlled by control circuitry of the printing device 105. At least the motorized drive roller 125 propels the continuous print media 120 through the printzone 110, allowing for the deposit of printing fluid at arrow 115, wherein, following printing, the print media is output from the printing device 105 in direction 130. The output may be configured in a "free-to-floor" configuration, or be arranged to be received by a further device.

FIG. 1A also shows a media management device 140, which may be used with, or form part of, the printing device 105. In the example of FIG. 1A, the media management device 140 comprises a roll management device as media is supplied from an external media source in the form of a roll. Even though the phrase "roll management device" is used in relation to this example, in other examples, the media management device 140 may be used with other forms of external media source. References to "roll" in this example should be understood as also applying to other media sources.

In the side view of FIG. 1A, the printzone 110 of the printing device 105 is spatially separated from the roll management device 140; however, in other examples, the roll management device 140 may be spatially integrated into a closed body of the printing device 105. In the example of FIG. 1A, the roll management device 140 is located below the printzone 110. For example, the roll management device 140 may be self-supported and reside on a floor in an installation. The printing device 105 may then be arranged in relation to the roll management device 140 such that the printzone 110 is above the roll management device 140. In one set of cases, the roll management device 140 may be integrated into a structure of the printing device 105; in another set of cases, the roll management device 140 may be structurally couplable to the printing device 105; in yet another set of cases, the roll management device 140 may be detached from the printing device 105 while being fixedly aligned with the printzone 110. In other examples, the roll management device 140 may be arranged in other locations relative to the printzone 110, e.g. to the rear (right in FIG. 1A) and/or above the printing device 105.

The roll management device 140 is configured to enable a roll of continuous print media 150 to be managed, e.g. to be handled and/or controlled, independently of the printing device 105, e.g. independently of media transport provided in the printzone 110. This may be compared to comparative printing devices where a roll of continuous print media is mounted within the printing device and supplied directly to the motorized drive roller 125. The roll 150 in FIG. 1A may be a large or "jumbo" roll that is located in an inline external device and/or mounting. In these comparative cases, conditions at the roll 150, may affect image quality by affecting printing in the printzone 110.

In FIG. 1A, the roll management device 140 receives the continuous print media 120 from the input roll 150. In FIG. 1A, the continuous print media 120 is received by the roll management device 140 at an input media interface 155. In certain implementations, this may comprise an opening to receive the continuous print media 120; in other implementations, this may comprise one or more of, for example, rollers, guidance surfaces and apertures to receive the continuous print media 120. In these other implementations, a leading edge of the continuous print media 120 may be fed into the input media interface 155 during loading of a new roll.

In FIG. 1A, the continuous print media 120 passes through the roll management device 140 and is output at an output media interface 160. As above, the output media interface 160 may comprise a variety of forms depending on implementation, from an opening in the roll management device 140 to more complex media transport mechanisms. The output media interface 160 supplies the continuous print media 120 to the motorized drive roller 125 of the printing device 105. The roll management device 140 then controls a tension of the continuous print media 120 within the device such that it is isolated from any tension experienced in the roll 150.

In more detail, the roll management device 140 of FIG. 1A comprises a nip 165 defined in relation to a motorized nip roller 170 of the roll management device 140. The nip 165 comprises a point in a media transport path where a force is applied to the continuous print media 120 to control the tension therein. This force may be applied across the width of the continuous print media 120 (e.g. along an axis that is perpendicular to the plane of FIG. 1A). This force may be applied uniformly or differentially along the width of the continuous print media 120, depending on the complexity of tension control for the implementation. The nip 165 may comprise a gap or pinch-point between the motorized nip roller 170 and an additional roller, such as a smaller idle or undriven roller. The motorized nip roller 170 may extend across at least a width of the continuous print media 120 or may comprise a plurality of rollers, such as a set of independently driven rollers, aligned on a common axis. In one case, one or more of the motorized driver roller 125 and the motorized nip roller 170 may extend across at least a portion of the width of the printing device 105. In FIG. 1A, the continuous print media 120 is received by the nip 165 from the roll 150 and is supplied from the nip 165 to the motorized drive roller 125 of the printing device 105. The roll management device 140 is thus arranged to isolate a tension in the continuous print media 120 at the motorized drive roller 125 from a tension in the continuous print media at the input roll 150.

In certain cases, the nip 165 may comprise multiple nips. For example, the nip 165 may comprise a plurality of independent assemblies (e.g. 5, 10 or 20 etc.) that are spaced along the length of one or more nip rollers such as motorized nip roller 170 (i.e. along a width of the continuous print media). Each assembly may comprise at least one nip roller that is arranged to apply a force to the continuous print media within the nip 165. The at least one nip roller may be an idle, e.g. undriven, roller. This force may be applied by an urging mechanism, such as a spring, that urges the at least one nip roller towards the motorized nip roller 170. In one implementation, each assembly may comprise two short parallel nip rollers and a spring-loaded mechanism which, in use, presses the two rollers against the motorized nip roller 170. In this case, the continuous print media 120 passes between the motorized nip roller 170 and the two short nip rollers of each assembly.

In one implementation, the motorized nip roller 170 may control a tension in the continuous print media by running in a torque control mode, where it acts a slave roller to the motorized drive roller 125 of the printing device 105. Torque control may be applied via a closed-loop motion control system, where a winding current consumption of a driver of the motorized nip roller 170 (such as an electric motor) is controlled in a closed loop to maintain a particular torque at an output shaft of the driver regardless of the speed or position of the shaft. In this case, when the motorized drive roller 125 of the printing device 105 advances the continuous print media 120, a controller for the driver sees a spike in the driver winding current, e.g. as caused by excess tension in the media, and adjusts the driver accordingly to let the media pass at a controlled tension level.

As such, in the example of FIG. 1A, at least one level of tension control is provided by the motorized nip roller 170, to which a torque is applied by a driver such as a motor under the control of a controller. The controller may form part of the printing device 105 or part of the roll management device 140. The tension of the continuous print media 120 may be set via a torque of the motorized nip roller 170 as applied by a motor or servo and a radius of the roller. If the controller forms part of the printing device 105, the motorized nip roller 170 may be controlled by the printing device 105, e.g. control circuitry of the printing device 105 may be electrically coupled to a motor or servo used to rotate the motorized nip roller 170.

In certain cases, tension may be controlled by differentially controlling the motorized nip roller 170 and the motorized drive roller 125. Control may be applied such that a tension in the continuous print media 120 between the roll management device 140 and the printzone 110 is independent of, i.e. isolated from, a tension in the continuous print media 120 between the input roll 150 and the roll management device 140. This is useful where input rolls have different (i.e. varying) radii, and/or where different media types have different weights. In these cases, when a roll and/or media type is changed, the tension in the continuous print media 120 between the printing device 105 and the roll 150 also changes; as such in comparative approaches, the printing device 105 needs to compensate for the changes. Furthermore, it may be difficult to control and/or predict the tensions between the printing device 105 and the roll 150 for large rolls and/or heavy media types. In these cases, without the roll management device 140, it may be difficult to control the tension in the continuous print media 120, leading to poor image quality due to perturbations in the printzone 110. By isolating the roll 150 from the printing zone 110, the roll management device 140 allows the printing device 105 to apply media control routines based on a predefined tension in the continuous print media 120.

In certain cases, the motorized nip roller 170 has a lower coefficient of friction with respect to the continuous print media than the motorized drive roller 125 of the printing device. For example, both rollers may comprise an outer rubber layer but with different surface configurations. This feature may help any slippage of the print media to occur with respect to the roll management device 140, as opposed to occurring in relation to the motorized drive roller 125 and thus influencing the position of the print media in the printzone 110.

Figure 1B:
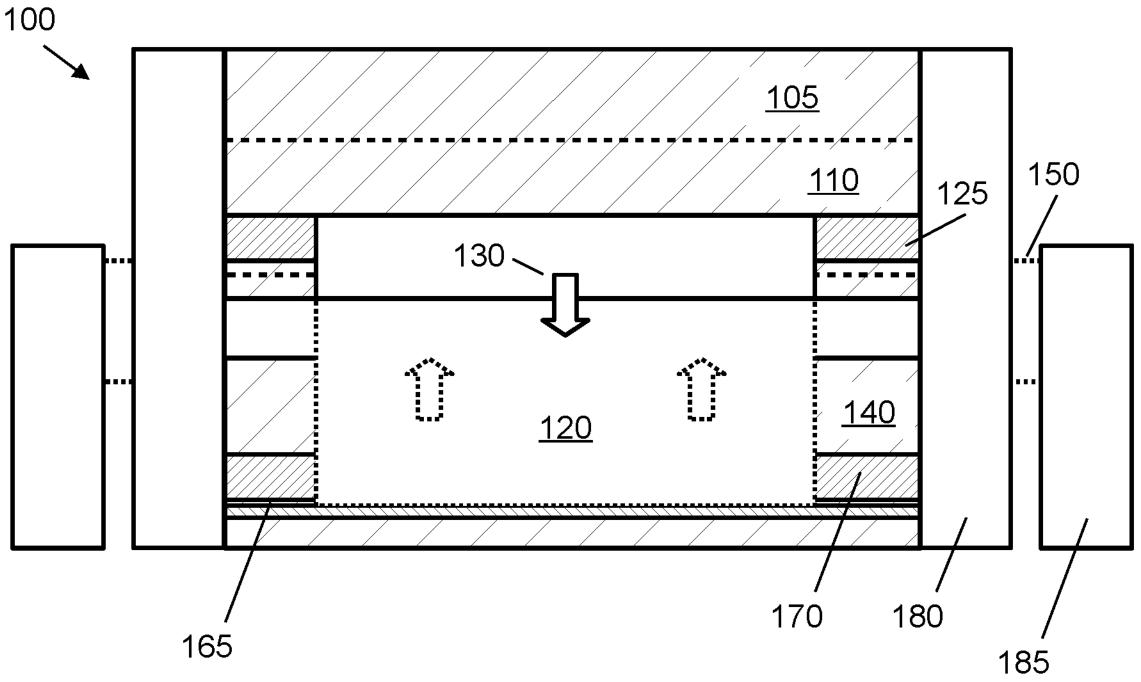
FIG. 1B is a schematic front view of a media processing device according to an example.

FIG. 1B shows a front view of the printing device 105. It should be noted that this front configuration is provided for example and may vary between implementations. As can be seen in this figure, the printzone 110, the motorized drive roller 125, the nip 165, and the motorized nip roller 170 extend across a width of the printing device 105, which is greater than a width of the continuous print media 120. A leading edge of the continuous print media 120 is shown emerging from the printing device 105 at arrow 130 in FIG. 1B. In FIG. 1B, the printing device 105 and the roll management device 140 are rigidly mounted in relation to each other via housing 180. As such, the printing device 105 may be considered to comprise the housing 180 and the roll management device 140. In other cases, these may be provided separately, e.g. as couplable or independent modular structures. For example, in certain cases, the roll management device 140 may be provided as a separate module or kit to allow for the upgrade of existing printing devices 105. In these cases, an existing roll spindle may be removed and replaced with the roll management device 140. The input roll 150 is mounted within a separate housing 185, which in this example is located behind the printing device 105. In other cases, the roll 150 may be mounted in a structure that forms part of the printing device 105. Numerous configurations are possible.

Figure 2:
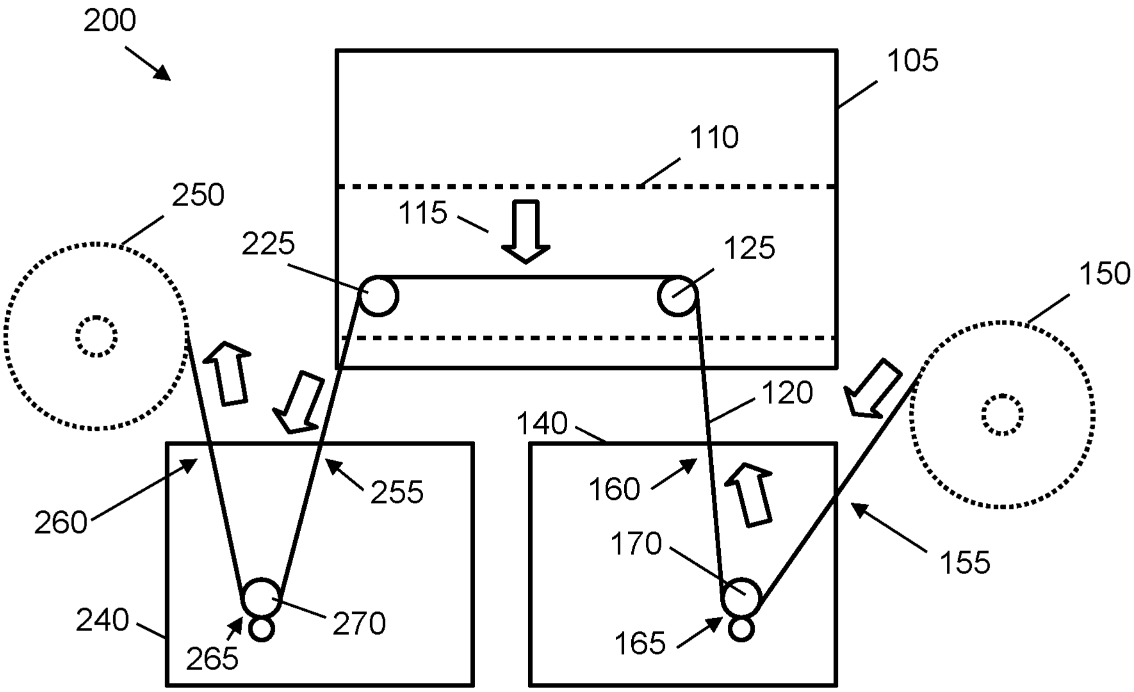
FIG. 2 is a schematic side view of a media processing device comprising an output media management device according to an example.

FIG. 2 is a schematic side view showing an alternative configuration of the printing device 105. In this example, the printing device 105 also comprises an output media management device 240. In this case, the output media management device 240 is provided in addition to the roll management device 140. The roll management device 140 is shown with a similar configuration to that shown in FIG. 1A. The output media management device 240 may be arranged to function in a similar manner to the roll management device 140 on an output of the printing device 105, e.g. to handle continuous print media 120 that contains printed images. For example, in addition to, or as an alternative to, a "fall-to-floor" configuration and/or an "internal take-up-reel" configuration, the output media management device 240 may enable the continuous print media 120 to be re-rolled following deposit of printing fluids. In certain cases, the printing device 105 is configured to allow a printed image to dry and/or cure before being re-rolled. This may be performed by way of one or more heating devices and/or lengths of media transport.

The output media management device 240 comprises an input media interface 255 to receive the continuous print media 120 from an output roller 225 of the printzone 110. The input media interface 255 may be configured as per the description of the roll management device interfaces 155, 160 above. The output media management device 240 comprises a nip 265 defined in relation to a motorized nip roller 270 of the output media management device 240. The nip 265 and the motorized nip roller 270 may be configured in a similar manner to the nip 165 and motorized nip roller 170 of the roll management device 140, e.g. as described above. In certain cases, the nip 265 and the motorized nip roller 270 of the output media management device 240 may differ from the nip 165 and motorized nip roller 170 of the roll management device 140, e.g. the components of the output media management device 240 may be differentially configured to avoid damage to a printed image found upon the continuous print media 120. Similarly, the requirements for tension control in the output media management device 240 may be more relaxed, as the downstream tension control may have less of an effect on perturbations in the printzone 110.

In FIG. 2, the output media management device 240 also comprises an output media interface 260 to supply the continuous print media 120 for storage following the deposit of printing fluid. In the present example, storage is provided via an output roll 250; however, other storage means are possible, e.g. the nip 265 may output a leading edge of the continuous print media 120 to the floor and/or to a cutting and/or stacking device.

In a similar manner to the roll management device 140, the output media management device 240 is arranged to isolate a tension in the continuous print media 120 at the output roller 225 of the printzone 110 from a tension in the continuous print media following the output media interface 260. For example, this isolation may avoid re-rolling issues or snags in the output media from affecting a printing operation in the printzone 110. In a similar manner to the roll management device 140, tension control may be provided via differential control of the output roller 225 of the printing device 105 and the motorized nip roller 270 of the output media management device 240, e.g. via the closed-loop control described above.

In certain cases, the output media management device 240 may be supplied independently of a downstream media storage device, such as an output roll. In other cases, the output media management device 240 may comprises an output roll for storing the continuous print media following deposit of printing fluid, wherein the output media interface 260 is arranged to supply the continuous print media 120 to the output roll 250. Again, numerous configurations are possible.

Use of an input media management device, such as roll management device 140, and an output media management device 240 in combination thus isolates upstream and downstream media perturbations from the media processing zone, e.g. printzone 110. This can improve processing, e.g. print or finishing, quality and facilitate the use of a greater range of media supply and storage devices. For example, a modular approach to media supply and/or storage may be taken, wherein devices may be swapped in and out of use depending on the print job specifications. This then provides greater flexibility. It can also aid in providing a consistent loading and/or uploading routine despite the use of different roll configurations and media types. For example, an input media management device and/or an output media management device may have a consistent loading and/or uploading procedure, e.g. to insert media into the input media interface 155 or 255 and/or to retrieve media from the output media interface 160 or 260. An input management device and/or an output media management device further allow for input and/or output media source, such as rolls to form part of the media processing device or form part of external equipment. For example, an operator of the printing device 105 may use large or "jumbo" rolls on the input and/or output for one set of print jobs (e.g. for large textile or vinyl flooring prints), before swapping in smaller rolls for a different set of print jobs (e.g. graphics for boat or van decal). This may be easily managed by the printing device 105 as the tension control is isolated from the roll and media types.

Figure 3:
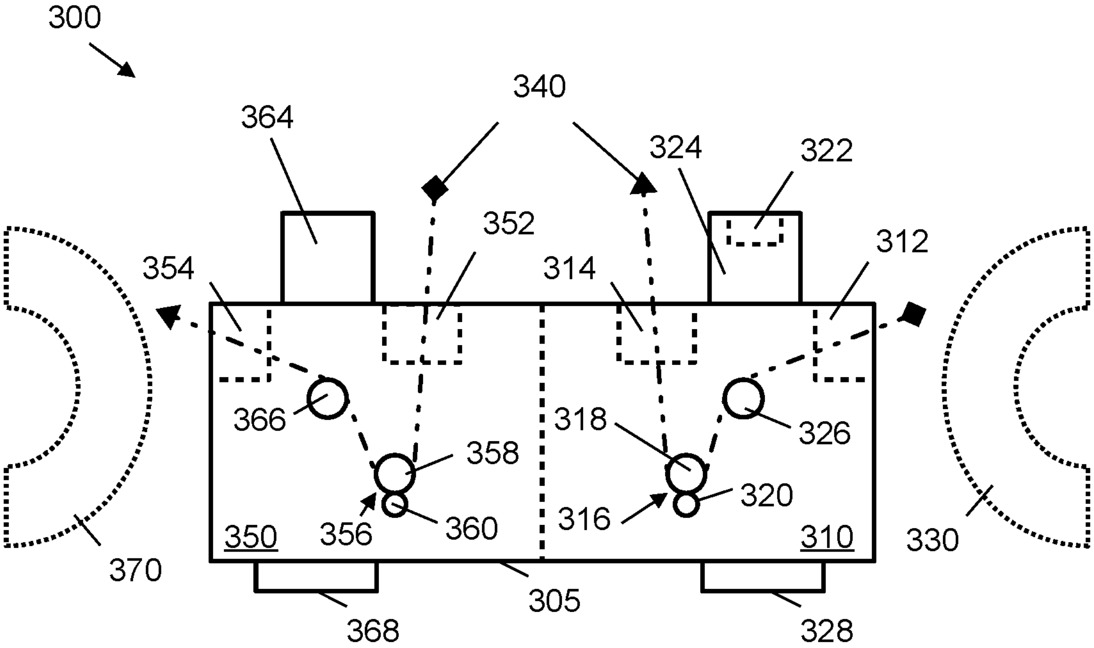
FIG. 3 is a schematic side view of a media management device according to an example and FIG. 3A is another schematic side view of a media management device according to an example including a levered mechanism.

FIG. 3 shows an example 300 of a media management device 305 that may be supplied as an independent component for coupling to a media processing device. The media processing device may be a printing or other web handling device. For example, media management device 305 may be supplied as an accessory or auxiliary device for an existing media processing device, and/or may be assembled into a new media processing device as a "fit-in" module.

The example of FIG. 3 comprises both input and output media management. In FIG. 3, the media management device 305 has an input section 310 and an output section 350. The input and output sections 310, 350 may provide functionality similar to the roll management device 140 and the output media management device 240. In certain cases, one of the two sections may be provided, e.g. the input section 310 may be present but not the output section 350 (e.g. to implement a device similar to that shown in FIG. 1) or vice versa.

The input section 310 of the media management device 305 comprises an input media interface 312 to receive continuous print media from an external media source 330. The external media source is illustrated in FIG. 3 as a roll; however, other media source configurations are possible. The continuous print media is shown as portions of dot-dash lines. As described previously, the external media source 330 may form part of an external device and so is shown using dashed lines. The input section 310 also comprises an output media interface 314 to supply the continuous print media to an input roller of a media processing device. The input and output media interfaces 312, 314 may be constructed in a similar manner to input and output media interfaces 155, 160 shown in FIG. 1. The input section 310 further comprises a nip 316 defined between a first roller 318 and a second roller 320. At least one of the first and second rollers 318, 320 comprises a motorized roller. For example, a larger roller such as the first roller 318 as shown in FIG. 3 may be motorized to form a motorized nip roller. The continuous print media is received by the nip 316 from the input media interface 312 and is supplied from the nip 316 to the output media interface 314. From the output media interface 314, the continuous print media is supplied to a media processing zone of a media processing device, e.g. as indicated by the arrows 340. The media processing zone may comprise the printzone of a printing device, such as is shown in FIGS. 1A, 1B and 2.

FIG. 3 also shows an electrical interface 322 to receive control signals from the media processing device. In FIG. 3, the electrical interface 322 forms part of a larger mechanical interface 324 for coupling the media management device 305 to a media processing device. In other cases, the electrical interface 322 may be separate from the mechanical interface 324, e.g. may comprise a plug-and-socket arrangement or the like, with one or more electrical connectors. The electrical interface 322 may enable the media management device 305 to be electrically coupled to a systems bus of a mechanically coupled media processing device, and/or may comprise connections to control circuitry of the media processing device. The media management device 305 may apply passive control via instructions supplied by the media processing device. In other cases, the media management device 305 may comprise integrated control circuitry to apply active control from within the device. In this case, there may be no electrical coupling with the media processing device, or an electrical coupling may remain and the media processing and media management devices may communicate to control the tension. In FIG. 3, both the input section 310 and the output section 350 have a mechanical interface component; however, in other examples, the mechanical interface may be independent of any one section and may be provided in one or more portions of the media management device 305. The mechanical interface 324 is used to couple the media management device 305 to a respective mechanical interface of the media processing device. It may comprise support members on one of the devices that are received in an aperture on one of the other devices. It may also comprise fastening means such as screws and/or clips to secure the devices in relation to each other.

In FIG. 3, the media management device 305 is arranged to control the motorized roller, e.g. first roller 318. This control may be performed in response to control signals from a media processing device, e.g. as received over the electrical interface 322, or in response to internal signals. The control acts to isolate a tension in the continuous print media at an input roller of the media processing device from a tension in the continuous print media at the external media source 330. This may be performed as described above with reference to FIGS. 1A and 1B. This may comprise active and/or passive control.

The example media management device 305 of FIG. 3 also comprises a diverter 326. The diverter 326 is provided in the input section 310. The diverter 326 is configured between the input media interface 312 and the nip 316 to adjust a wrap angle of the continuous print media around the motorized roller, e.g. the first roller 318. The wrap angle is the angle of the sector on the motorized roller where the continuous print media is in contact with the roller. As shown in FIG. 3, the diverter 326 increases the incident angle of the print media as it reaches the motorized roller, so as to increase the wrap angle around the roller. The diverter 326 may be used to normalize an angle at which the continuous print media is receive at the input media interface 312. For example, the diverter 326 may be useful when using "jumbo" rolls where the angle of receipt is shallower than for other roll types. The diverter 326, as described here, may also be used in the other examples.

The output section 350 of the media management device 305 is configured in a similar manner to the output media management device 240 of FIG. 2. The output section 350 comprises an input media interface 352 to receive, in use, continuous print media from an output roller of a media processing device, e.g. as indicated by the diamond end of the dot-dash line representing the print media. The input media interface 352 may be configured as per the description of the roll management device interface 255 above. The output section 350 comprises a nip 356 defined in relation to a first roller 358. The nip 356 is formed between the first roller 358 and a second roller 360. The nip 356 and the first roller 358 may be configured in a similar manner to the nip 265 and motorized nip roller 270 of the output media management device 240, e.g. as described above with reference to FIG. 2 above. In certain cases, the nip 356 and the first and second rollers 358, 360 of the output section 350 may differ from the nip 316 and first and second rollers 318, 320 of the input section 310, e.g. as discussed above. Alternatively, they may be mirrored versions of a common set of components. The output section 350 also comprises an output media interface 354 to supply the continuous print media for storage on an external media storage device 370. In FIG. 3, this is shown as an output roll but other devices may alternatively be used. In FIG. 3, large "jumbo"-style rolls are shown, but other storage and supply types, as well as other roll sizes, may be used. Although, an output roll is shown, other storage means are possible, e.g. the output media interface 354 may output a leading edge of the continuous print media to the floor and/or to a cutting and/or stacking device.

In the example of FIG. 3, the media management device 305 is designed to be self-supported on feet 328 and 368. In other examples, the media management device 305 may be supported by a structure of the media processing device. In the example of FIG. 3, the media management device 305 may be installed on a floor below the media processing device. In certain cases, the media processing device comprises a printing device.

Figure 3A:
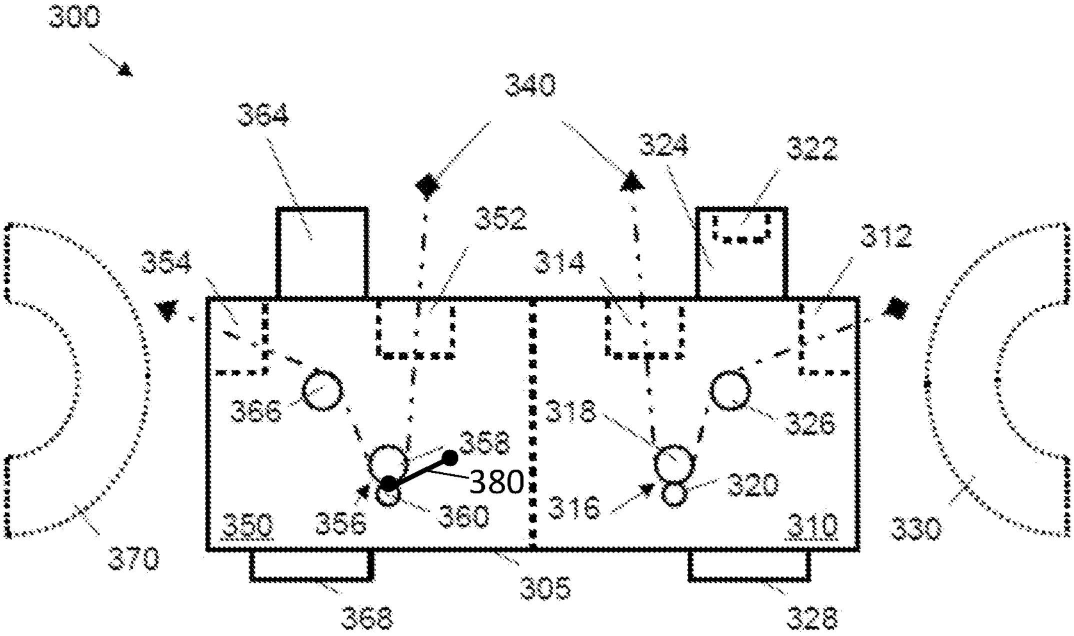

In certain cases, the media management device 305 may comprise a levered mechanism 380 (FIG. 3A) to increase a separation of at least one of the nips 316, 356 to enable insertion of a leading edge of a new continuous print media. For example, the second rollers may be mounted upon an elongate support member that is rotatably fastened to a housing of the media management device 305 at a pivot point. In normal use, e.g. while printing, this elongate support member may be locked into a first position where the nip is "closed" (i.e. where there is a first distance between the first and second rollers). When loading and/or unloading the continuous print media, the elongate support member may be unlocked and allowed to pivot and rotate away from the location of the nip. This "opens" the nip, i.e. increases the distance between the first and second rollers such that the sheet of continuous print media may be inserted and/or removed. Once the continuous print media has been inserted and/or removed, the nip may be closed again by pivoting the support member back to the locked position.

In certain cases, the media management device 305 may also comprise one or more spindles to mount rolls of continuous print media. For example, the media management device 305 may comprise a spindle to mount an input roll and/or a spindle to mount an output roll. This then may allow the rolls to be mounted as part of the media management device 305. This may be an option for smaller rolls of print media, or as a backup option for the supply and/or retrieval of print media. For example, these integrated spindles may provide an "internal take-up-reel" and/or an "internal supply-reel" configuration.

As shown in FIG. 3, the output section 350 may also comprise a diverter 366 configured between the output media interface 354 and the nip 356 to adjust a wrap angle of the continuous print media around the first roller 358. Again, the diverter 366 may be used and/or mounted to increase a wrap angle around the first roller 358, e.g. due to a shallow exit angle of the continuous print media through the output media interface 354.

In certain cases, the media management device 305 may comprise a tension monitoring device. For example, this may take the form of a sensor coupled to a roller applied to the continuous print media. Tension may be measured in one or more locations on the continuous print media. Tension measurements may be used by a controller of the media management device 305 to control tension in the device and/or may be transmitted to a controller of the media handling device (e.g. where control is passive with respect to the media management device). In one case, a tension monitoring device may comprise a load cell installed at one of diverters, e.g. at diverter 326 and/or diverter 366. Measuring tension within the media management device may improve the nip roller's ability to isolate the tension between the external media source and processing zone.

In a complementary manner, a media processing device as described herein may be supplied independently of the media management device. For example, a media processing device such as a printing device may be adapted to interface with a media management device as described herein. In this manner, media processing devices may be manufactured such that there operate with, i.e. are couplable to, different media management devices. In this case, the media processing device may comprise a media processing zone for processing a portion of continuous print media and a motorized drive roller to receive the continuous print media for transport through the media processing zone. For example, the media processing device may have features similar to the media processing devices of the previous examples. In this case, the media processing device further comprises a media interface to receive a continuous print media from a media management device, wherein a tension in the continuous print media at the motorized drive roller is isolated from a tension in the continuous print media at an external media source using the media management device. For example, the media processing device may comprise the printing device 105 of FIGS. 1A, 1B and 2, in a case where the device is provided independently of the roll management device 140. In a similar manner to the previously described media interfaces of the media management device, a media processing device may comprise one or more of a media interface for receiving continuous print media from an input media management device and a media interface for supplying print media to an output media management device. A media interface may comprise a nip defined in relation to a motorized drive roller of the media processing zone. In certain cases, a media interface may comprise an aperture to receive or supply a leading edge of a continuous print media.

Figure 4:
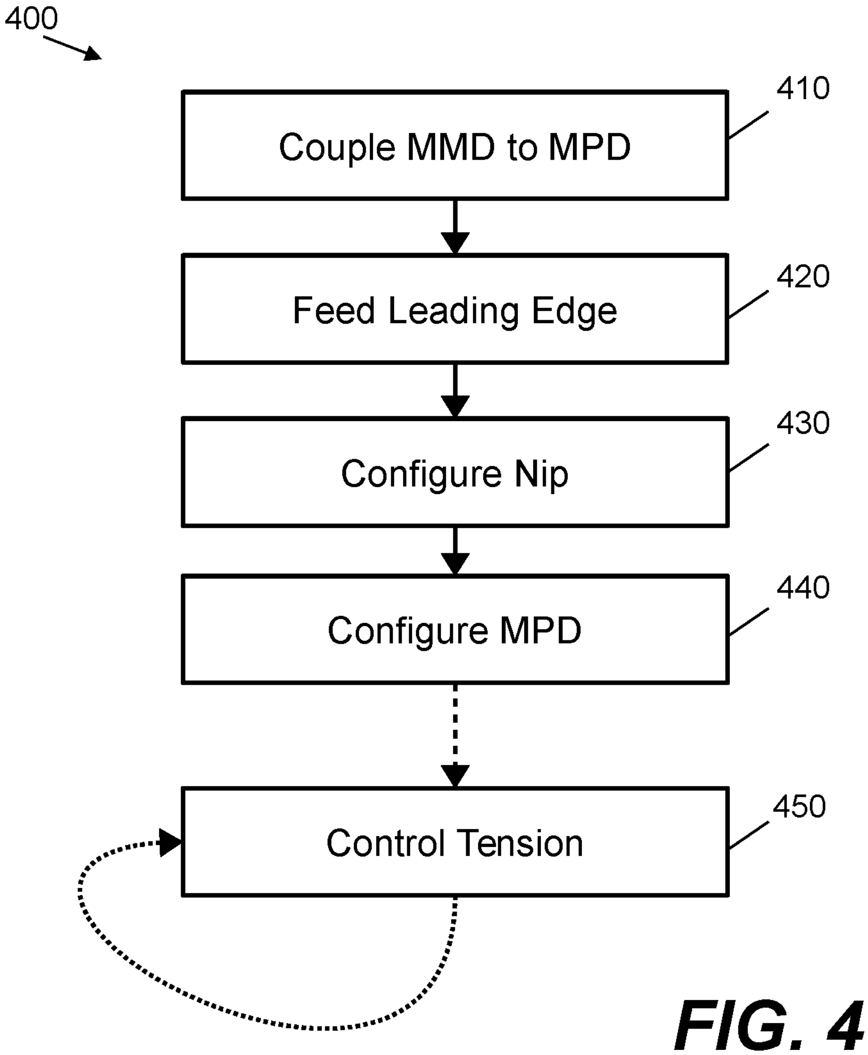
FIG. 4 is a flow diagram showing a method of operating a media processing device according to an example.

FIG. 4 shows an example method 400 of operating a media processing device. This method may be applied to the printing device 105 of FIGS. 1A, 1B or 2, or may be applied to a media processing device that is being used with the media management device 305. Alternatively, the method may be applied using a different media management device to that shown in the other Figures.

At block 410, a media management device is coupled to the media processing device. The media processing device may comprise a printing device or other web handling device, e.g. in a printing system. In certain cases, the media management device may form part of the media processing device and as such may be deemed to be "pre-coupled", i.e. supply of such a media processing device includes supply of a coupled media management device. In other cases, e.g. when using the media management device 305 of FIG. 3, the media management device may be physically and electrically coupled to the media processing device. This may involve coupling one or more mechanical interfaces of the media management device, such as mechanical interfaces 324, 364, to corresponding mechanical interfaces of the media processing device. It may also comprise coupling one or more electrical interfaces, e.g. such as electrical interface 322, to corresponding electrical interfaces of the media processing device. In one case, power may also be supplied from the media processing device across the coupled electrical interfaces. In another case, the media management device may have an independent power supply.

At block 420, a leading edge of continuous print media supplied from an external media source is fed through a nip between two rollers of the media management device to an input roller of the media processing device. For example, this may comprise feeding a leading edge through nip 165 or 316 such that it wraps around rollers 170 or 318. In certain cases, as described above, a mechanism may be provided to "open" the nip 165 or 316, i.e. to move a lower roller away to allow the leading edge to be inserted.

At block 430, the nip is configured to apply a force to the continuous print media. This may comprise applying a torque to a motorized nip roller and/or closing the nip such that the continuous print media wraps around the motorized nip roller. It may also, or alternatively, comprise urging nip rollers towards the motorized nip roller, where the continuous print media is configured between the urged nip rollers and the motorized nip roller.

At block 440, the media processing device is configured to feed the continuous print media from the media management device through a media processing zone. This may comprise a printzone of a printing device. This may comprise supplying a leading edge to motorized roller 125 as shown in FIGS. 1A and 2. The media processing device may also comprise a nip between two rollers that "takes" the leading edge of the continuous print media and feeds it into the media processing device, e.g. such that it may be aligned within the printzone 110 as shown in FIGS. 1A and 2. Automated control routines may be applied to configure a media transport of the media processing device to receive the continuous print media. This block may also comprise applying tension control within the media processing device, e.g. by differential control of rollers 125 and 225, to ready the media processing device for media processing, e.g. the deposit of printing fluid such as ink, gloss or varnish.

Blocks 410 to 440 may be performed to initially configure or "setup" the media processing device. Block 450 may then be performed to during media processing by the media processing device, e.g. during printing or finishing. This may be a period of time after performing blocks 410 to 440, as indicated by the dashed arrow. Block 450 may be repeated for each media processing operation, as shown by the dotted arrow in FIG. 4. At block 450, a tension in the continuous print media is controlled by driving an input roller of the media processing zone, such as roller 125 in FIGS. 1A and 2, and at least one of the two rollers of the media management device, e.g. rollers 170 or 318. For example, differential control of these rollers may be used to control a tension in the continuous print media. The tension in the continuous print media at an input to the media processing device is controlled independently of a tension in the continuous print media at the roll.

The method 400 may also comprise operations to change an external media source, e.g. a roll of continuous print media. These operations may comprise, following a media processing operation: configuring the nip to remove a force applied to the continuous print media; removing the continuous print media from the media management device; and repeating the feeding and configuring operations of blocks 410 to 440 for a second roll of continuous print media. In a printing case, this allows printing on a second, possibly different, roll without significant change in the configuration of the media processing device.

Certain examples described herein enable media control in a media processing device to be applied independently of how the media is supplied. The examples thus isolate an external media source from a media processing device. The examples may be applied to media processing devices in a printing system, such as printing devices, finishing devices, and pre- and post-processing devices. Certain examples allow for a much greater variety of external media sources, e.g. allow for different roll sizes and media types. These examples help decouple the media processing device from the loading forces experienced in external sources of continuous print media. This allows support for "jumbo" rolls, e.g. rolls around 1 m in diameter. The examples described herein are particularly suited to medium-sized, large-format printing devices, e.g. devices that are used for a large variety of different print jobs on different media.

The preceding description has been presented only to illustrate and describe examples of the principles described. This description is not intended to be exhaustive or to limit these principles to any precise form disclosed. For example, printing fluid, as described herein, may comprise inks, glosses, varnishes and the like. Media processing may comprise printing, cutting, folding, laminating, stacking, applying glosses and/or varnishes, stitching, etc. Media may be supplied from external media sources such as rolls, stacks, other media processing devices, hand-supplied media etc. Features of individual examples may be combined in different configurations, including those not explicitly set out herein. Many modifications and variations are possible in light of the above teaching.

What is claimed is:

1. A media management device, comprising:

an input media interface to receive continuous print media from an external media source;

an output media interface to supply the continuous print media to an input roller of a media processing printing device comprising a printzone for deposit of printing fluid; and a nip defined between a first roller and a second roller, wherein at least one of the first roller and the second roller comprises a motorized roller, wherein the motorized roller has a lower coefficient of friction with respect to the continuous print media than the input roller of the media processing printing device, and wherein the continuous print media is received by the nip from the input media interface and is supplied from the nip to the output media interface;

wherein the motorized roller is controlled to isolate a tension in the continuous print media at the input roller of the media processing printing device from a tension in the continuous print media at the external media source to allow control of the continuous print media in the media processing printing device to be isolated from conditions at the external media source.

2. The media management device of claim 1, comprising:

a diverter configured between the input media interface and the nip to adjust a wrap angle of the continuous print media around the motorized roller.

3. The media management device of claim 1, comprising:

a tension monitoring device to measure a tension in the continuous print media.

4. The media management device of claim 1, comprising:

a spindle to mount a roll of continuous print media for supply to the input media interface as the external media source.

5. The media management device of claim 1, further comprising, in addition to the input and output media interfaces, an electrical interface to receive control signals from the printing device.

6. The media management device of claim 1, further comprising the printing device interfaced with the media management device.

7. A media management device, comprising:

an input media interface to receive continuous print media from an external media source;

an output media interface to supply the continuous print media to an input roller of a media processing printing device comprising a printzone for deposit of printing fluid; and a nip defined between a first roller and a second roller, wherein at least one of the first roller and the second roller comprises a motorized roller, and wherein the continuous print media is received by the nip from the input media interface and is supplied from the nip to the output media interface;

wherein the motorized roller is controlled to isolate a tension in the continuous print media at the input roller of the media processing printing device from a tension in the continuous print media at the external media source to allow control of the continuous print media in the media processing device to be isolated from conditions at the external media source, the media management device further comprising a levered mechanism to increase a separation of the nip to enable insertion of a leading edge of a new continuous print media.

8. A device comprising:

a media processing device;

an input media management device;

the media processing device including a media processing zone for processing a portion of continuous print media; and a motorized drive roller to receive the continuous print media for transport through the media processing zone, wherein the media processing device is couplable via an interface to the input media management device, the media processing device further comprising:

an output media interface to receive the continuous print media from the input media management device, wherein a tension in the continuous print media at the motorized drive roller is isolated from tension in the continuous print media at an external media source using the input media management device to allow control of the continuous print media in the media processing device to be isolated from conditions at the external media source, and a nip defined in relation to a motorized nip roller of the media management device, wherein the continuous print media is received by the nip from the external media source and is supplied from the nip to the motorized drive roller of the media processing device, and wherein the motorized nip roller of the input media management device has a lower coefficient of friction with respect to the continuous print media than the motorized drive roller of the media processing device.

9. The media processing device of claim 8, wherein the media management device is removably couplable via the interface to the media processing device and the media processing device comprises:

a mechanical interface for coupling to a respective mechanical interface of the media management device to rigidly mount the media management device in relation the media processing device, and an electrical interface for coupling to a respective electrical interface of the media management device, wherein the media processing device is arranged to control a motorized roller of the media management device via the electrical interface to control the tension in the continuous print media.

10. The media processing device of claim 8, wherein the media management device comprises a spindle to mount a roll of continuous print media for supply to the media interface of the media processing device as the external media source.

11. The media processing device of claim 8, comprising:

an output media management device comprising:

an input media interface to receive the continuous print media from an output roller of the media processing zone, a nip defined in relation to a motorized nip roller of the output media management device, and an output media interface to supply the continuous print media for storage following media processing by the media processing device, wherein the output media management device is arranged to isolate a tension in the continuous print media at the output roller of the media processing zone from a tension in the continuous print media following the output media interface.

12. The media processing device of claim 11, wherein the output media management device comprises:

an output roll for storing the continuous print media following media processing, wherein the output media interface is arranged to supply the continuous print media to the output roll.

13. The media processing device of claim 8, wherein the media processing device comprises a printing device and the media processing zone comprises a printzone for deposit of printing fluid onto the continuous print media.

14. The media processing device of claim 8, wherein the media processing device is a printing device and further comprises a printzone for depositing printing fluid.

15. A method of operating a media processing device, comprising:

coupling a media management device to the media processing device;

feeding a leading edge of continuous print media supplied from an external media source through a nip between two rollers of the media management device to an input roller of the media processing device;

configuring the nip to apply a force to the continuous print media;

configuring the media processing device to feed the continuous print media from the media management device through a media processing zone of the media processing device; and during processing by the media processing device, controlling a tension in the continuous print media by driving an input roller of the media processing zone and at least one of the two rollers of the media management device, wherein a tension in the continuous print media at an input to the media processing device is controlled independently of a tension in the continuous print media at the external media source to allow control of the continuous print media in the media processing device to be isolated from conditions at the external media source, wherein at least one of the two rollers of the media management device comprises a motorized roller, wherein the motorized roller has a lower coefficient of friction with respect to the continuous print media than the input roller of the media processing device.

16. The method of claim 15, further comprising differentially controlling the input roller of the media processing zone and at least one of the two rollers of the media management device to control tension in the continuous print media.

17. A method of operating a media processing device, comprising:

coupling a media management device to the media processing device;

feeding a leading edge of continuous print media supplied from an external media source through a nip between two rollers of the media management device to an input roller of the media processing device;

configuring the nip to apply a force to the continuous print media;

configuring the media processing device to feed the continuous print media from the media management device through a media processing zone of the media processing device;

during processing by the media processing device, controlling a tension in the continuous print media by driving an input roller of the media processing zone and at least one of the two rollers of the media management device, wherein a tension in the continuous print media at an input to the media processing device is controlled independently of a tension in the continuous print media at the external media source to allow control of the continuous print media in the media processing device to be isolated from conditions at the external media source; and using a levered mechanism to increase a separation of the nip to enable insertion of a leading edge of a new continuous print media.

* * * * *